US007397009B2

(12) United States Patent
O'Donohue et al.

(10) Patent No.: US 7,397,009 B2
(45) Date of Patent: Jul. 8, 2008

(54) SYSTEMS AND METHODS FOR SORTING MAIL USING A NAME/FIRM DATABASE

(75) Inventors: Gerard O'Donohue, Centreville, VA (US); Lori Johnson, Ijamsville, MD (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 10/363,684

(22) PCT Filed: Sep. 10, 2001

(86) PCT No.: PCT/US01/42094

§ 371 (c)(1), (2), (4) Date: Mar. 6, 2003

(87) PCT Pub. No.: WO02/20183

PCT Pub. Date: Mar. 14, 2002

(65) Prior Publication Data

US 2003/0182017 A1 Sep. 25, 2003

Related U.S. Application Data

(60) Provisional application No. 60/231,310, filed on Sep. 8, 2000.

(51) Int. Cl.
*G06K 9/00* (2006.01)
*B07C 5/00* (2006.01)

(52) U.S. Cl. ........................ 209/584; 209/900; 382/101

(58) Field of Classification Search ................. 209/584, 209/900; 700/223-227; 382/101, 102
See application file for complete search history.

(56) References Cited

U.S. PATENT DOCUMENTS

| | | | | |
|---|---|---|---|---|
| 5,420,403 | A | 5/1995 | Allum et al. | |
| 5,422,821 | A * | 6/1995 | Allen et al. | 700/219 |
| 5,703,783 | A * | 12/1997 | Allen et al. | 700/213 |
| 5,910,998 | A | 6/1999 | Yui | |
| 6,292,709 | B1 * | 9/2001 | Uhl et al. | 700/226 |
| 6,327,373 | B1 * | 12/2001 | Yura | 382/101 |
| 2004/0083190 | A1 * | 4/2004 | Sanders | 705/404 |

* cited by examiner

*Primary Examiner*—Patrick Mackey
*Assistant Examiner*—Mark Hageman
(74) *Attorney, Agent, or Firm*—Finnegan Henderson Farabow Garrett & Dunner, LLP

(57) ABSTRACT

A system (100) and method for sorting mail (112) includes a first database (106) containing addresses and zipcodes for a plurality of mail item recipients, a second database (104) containing a plurality of individual and firm names and their associated addresses, and an imaging device (114) for capturing an image of address information on a mail item (112). Based on identified elements from the captured address information image, a subsystem (110) containing an algorithm compares the elements with the first database (106) and determines if there is a match of all elements. If one or more address information elements are unmatched, the algorithm compares the elements to the second database (104), and applies a set of criteria to the address information elements matched in the second database (104) to determine if a match exists.

11 Claims, 4 Drawing Sheets

FIRM / NAME MATCHING CRITERIA

| | A | B | C | D | E | F | G | H | I | J | K | L |
|---|---|---|---|---|---|---|---|---|---|---|---|---|
| | EXACT FIRM NAME MATCH | PRESUMED FIRM NAME MATCH | LAST NAME MATCH | FIRST & LAST NAME MATCH | STREET NAME MATCH | ZIPCODE SUFFIX MATCH | ST REET # MATCH | APT/ SUITE # MATCH | NO STREET INFO | ZIPCODE NO MATCH | ZIPCODE MATCH | MAKE A MATCH |
| 1 | Y | | | | Y | Y | N | N | | | Y | Y |
| 2 | Y | | | | Y | N | N | N | | | Y | Y |
| 3 | Y | | | | N | N | Y | Y | | | Y | Y |
| 4 | Y | | | | N | N | N | Y | | | Y | N |
| 5 | Y | | | | | | | | Y | | Y | Y |
| 6 | Y | | | | N | N | N | N | | | Y | N |
| 7 | Y | | | | Y | | | | | Y | | Y |
| 8 | | Y | | | Y | Y | N | N | | | Y | Y |
| 9 | | Y | | | Y | N | N | N | | | Y | Y |
| 10 | | Y | | | N | N | Y | Y | | | Y | Y |
| 11 | | Y | | | N | N | N | Y | | | Y | N |
| 12 | | Y | | | | | | | Y | | Y | N |
| 13 | | Y | | | N | N | N | N | | | Y | N |
| 14 | | Y | | | Y | | | | | Y | | N |
| 15 | | | Y | | Y | Y | N | N | | | Y | Y |
| 16 | | | Y | | Y | N | N | N | | | Y | Y |
| 17 | | | Y | | N | N | Y | Y | | | Y | N |
| 18 | | | Y | | N | N | N | Y | | | Y | N |
| 19 | | | Y | | | | | | Y | | Y | N |
| 20 | | | Y | | N | N | N | N | | | Y | N |
| 21 | | | Y | | Y | | | | | Y | | N |
| 22 | | | | Y | Y | Y | N | N | | | Y | Y |
| 23 | | | | Y | Y | N | N | N | | | Y | Y |
| 24 | | | | Y | N | N | Y | Y | | | Y | Y |
| 25 | | | | Y | N | N | N | Y | | | Y | N |
| 26 | | | | Y | | | | | Y | | Y | Y |
| 27 | | | | Y | N | N | N | N | | | Y | N |
| 28 | | | | Y | Y | | | | | Y | | Y |

FIG. 3

SYSTEMS AND METHODS FOR SORTING MAIL USING A NAME/FIRM DATABASE

RELATED APPLICATION

Under provisions of 35 U.S.C. § 119(e), the Applicant claims the benefit of U.S. provisional application Ser. No. 60/231,310, filed Sep. 8, 2000, which is hereby expressly incorporated herein by reference.

DESCRIPTION OF THE INVENTION

1. Technical Field

The present invention relates to an automated system and method of capturing and resolving addresses on mail items. More particularly, the present invention, which is illustrated by specific embodiments, involves capturing an electronic image of the addresses located on the mail items and resolving the intended addresses using an address matching system and method.

2. Background

The United States Postal Service (USPS) is an independent government agency that provides mail delivery and other services to the public. The USPS is widely recognized as a safe and reliable means for sending and receiving mail and other items. With the rapid increase of e-commerce and the economy, in general, the number of mail items processed by mail delivery providers, such as the USPS, has accordingly increased. As a means of efficiently processing and delivering the increased number of mail items, the mail delivery providers have employed automated address detection systems and methods.

Current automated systems and methods use imaging systems to capture an image of the address on the mail items, and then use image recognition software, which may employ a number of different algorithms (known in the art) to identify the symbols in the image. Once the symbols are identified, the symbols are combined to create address elements, such as an individual's name, a street name, a house number, or zipcode. These elements are then aggregated to compose the recipient's address.

Next, the composed address is compared to addresses in a pre-stored database that includes, for example, the recipient's name, house number, street name, city, state, and zipcode. Current automated systems will identify a match only if all of the elements in the composed address match the address in the database. Otherwise, the address on the mail item is identified as unresolved and the mail item is marked as undeliverable.

In addition to a fully automated means or as a hybrid automated system, mail item providers may utilize key operators to key in the address on the mail item and then attempt to match the keyed address to an address in a pre-stored database. Again, as with the current fully automated system and method described above, a match will only be identified if all of the elements in the keyed address match the address in the database. Otherwise, the address on the mail item is identified as unresolved and the mail item is marked as undeliverable.

SUMMARY OF THE INVENTION

Consistent with the present invention, a system and method for sorting mail items is provided that avoids the problems associated with current systems and methods for sorting mail items.

In one aspect, a system and method consistent with the present invention comprises a first database containing addresses and zipcodes for a plurality of mail item recipients; a second database containing a plurality of individual and firm names, and their associated addresses; an imaging device for capturing an image of address information on a mail item; and a subsystem containing an algorithm that compares the address information with the first database and determines if there is a match. If the address information is unmatched, the algorithm compares the address information to the second database and applies a set of criteria to the address information matched in the second database to determine if a match exists.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 3 is an exemplary table of the matching criteria consistent with the present invention.

DETAILED DESCRIPTION

Figure 1:
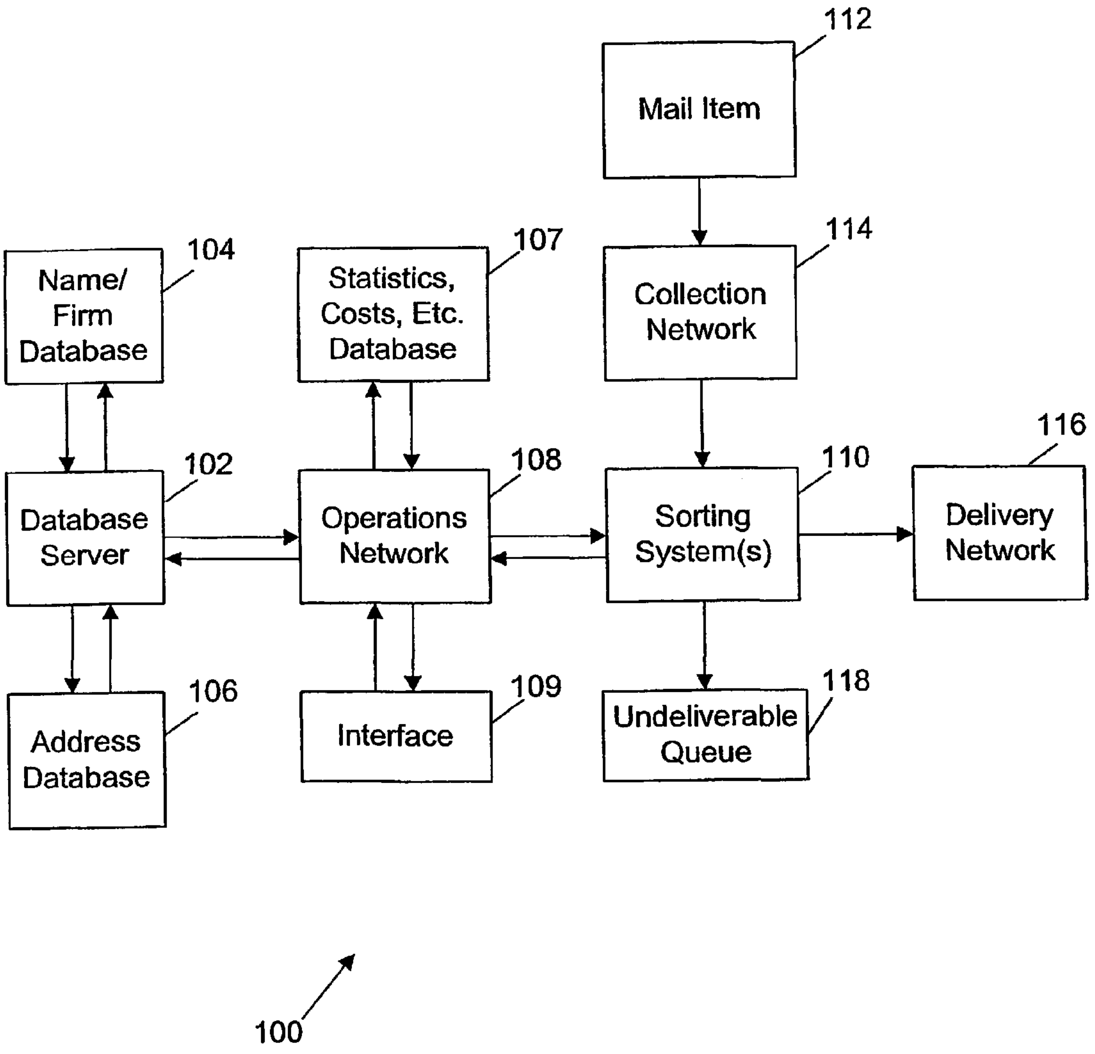
FIG. 1 is a block diagram illustrating an overview of a mail management system consistent with the present invention.

Reference will now be made to various embodiments according to the invention, examples of which are shown in the accompanying drawings and will be obvious from the description of the invention. In the drawings, the same reference numbers represent the same or similar elements in the different drawings whenever possible.

Introduction

Mail management system 100, in accordance with one embodiment of the present invention, improves mail provider service by expanding the current capabilities of a mail sorting system, which utilizes an address database to resolve address images taken from mail items. The mail sorting system is expanded by using external databases to improve the system's capability to resolve addresses, and thereby increase the number of mail items that are reliably delivered.

System Operation

FIG. 1 is a block diagram illustrating an overview of mail management system 100, in accordance with one embodiment of the present invention. FIG. 1 illustrates that database server 102 requests information from a name/firm database 104 and an address database 106, which may be stored in any semi-permanent or permanent holding place for digital data, such as a magnetic disk (e.g., floppy disk or hard disk), optical disk (e.g., CD, CD-ROM, DVD-ROM), or magnetic tape.

In response to the request from server 102, name/firm database 104 provides server 102 with information such as an individual or firm name, street name, street number, apt/suite number, zipcode, and zipcode suffix. Similarly, in response to the request from server 102, address database 106 provides server 102 with information such as the street number, street name, zipcode and zipcode suffix associated with an individual or firm. It may also be appreciated that the name/firm database 104 and the address database 106 may be combined to form one database.

Once server 102 receives the requested information from name/firm database 104 and address database 106, server 102 transmits the received information to the operations network 108, which may be comprised of a plurality of locally or remotely networked servers and/or computers and is associated with one or more interface(s) 109. These interfaces may be used to directly input address information, such as the information contained in address database 106, into operations network 108. Operations network 108 also stores and retrieves statistical information to and from statistical database 107. For example, statistical database 107 may contain statistical information such as the number of addresses on mail items that have been successfully and unsuccessfully captured and resolved.

Next, operations network 108, in turn, transmits the received information to the sorting system(s) 110, which may be comprised of an optical character subsystem, a remote computer reader subsystem, and an image processing subsystem. In one embodiment, sorting system(s) 110 receives the mail item 112 from collection network 114, which may be comprised of: collection stations, where customers deliver mail item 112 to the mail item delivery provider; and carriers that pick up mail item 112 at the customers residence or place of business and deliver it to the mail item delivery provider for processing, using sorting system(s) 110.

Sorting system(s) 110 is used to determine the address of the recipient of mail item 112 and to code mail item 112, so that it may be automatically handled by delivery network 116, before mail item 112 is delivered to the recipient. Delivery network 116 may be comprised of a mail distribution center, where mail item 112 is process based on the code assigned by sorting system(s) 110 and routed to the appropriate mail carrier for delivery to the mail item recipient. If, however, sorting system(s) 110 is unable to determine the address of the recipient, mail item 112 is sent to undeliverable queue 118, where mail item 112 is marked to be returned to the customer that originally sent mail item 112.

Figure 2:
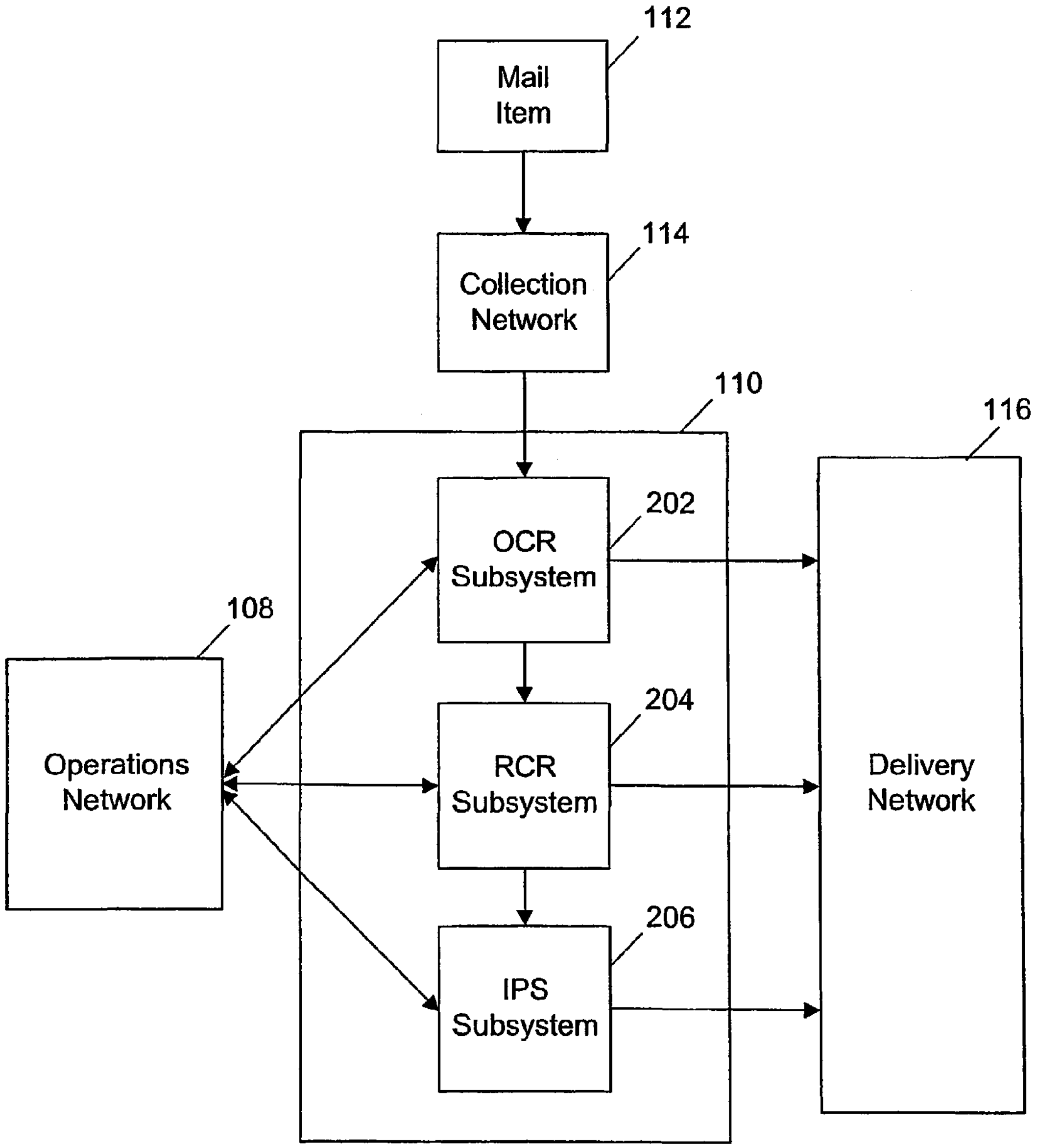
FIG. 2 is a block diagram illustrating additional details of the sorting system(s) consistent with the present invention.

FIG. 2 is a block diagram illustrating additional details of sorting system(s) 110 of mail management system 100, in accordance with one embodiment of the present invention. FIG. 2 illustrates that mail item 112 is inducted into mail collection network 114, where an imaging device, including, but not limited to a camera, optical scanner, or video camera, captures an image or a picture of the address on mail item 112. Once the address image is captured, it is submitted to an optical character reader subsystem (OCRS) 202, where a character recognition algorithm identifies the elements or words in the address image and composes the recipient's address. Then, OCRS 202 compares the composed address to an address in a nationally maintained address database such as address database 106, which may contain the street number, street name, zipcode and zipcode suffix associated with a residence or firm. If an exact match to the address image is found in address database 106, mail item 112 is transferred to delivery network 106 for delivery to the recipient.

However, if an exact match to the individual elements of the address image is not found in address database 106, an attempt is made to determine if a match to the address image is deemed to exist using name/firm database 104 and the matching criteria that will be illustrated in FIG. 3. Then, if a match is deemed to exist, mail item 112 is transferred to delivering network 106 for delivery to the recipient. The matching criteria will be discussed below in detail in conjunction with FIG. 3.

If OCRS 202 is unable to find a matching address, using address database 106, name/firm database 104, and the matching criteria that will be illustrated in FIG. 3, either because of character recognition problems or because of missing information in the address image, the address image is passed to the remote computer reader (RCR) 204, which may include an off-line character recognition system opposed to a live mail item identification system. RCR 204 uses a nationally maintained address database, such as the database used by OCR 202, but performs a different character recognition algorithm on the address image than OCRS 202 to find a match in address database 106. The character recognition performed by RCR 204 is most suitable for typewritten address labels, whereas the character recognition algorithm used by OCRS 202 is most suited for handwritten address labels. If an exact match to the address image is found in address database 106, mail item 112 is transferred to delivery network 106 for delivery to the recipient.

However, If an exact match to the individual elements of the address image is not found in address database 106, an attempt is made to determine a match to the address image using name/firm database 104 and the matching criteria that would be illustrated in FIG. 3. Then, if a match is deemed to exist, mail item 112 is transferred to delivery network 106 for delivery to the recipient. The matching criteria will be discussed below in detail in conjunction with FIG. 3.

Finally, if RCR 204 is unable to find a matching address, using address database 106, name/firm database 104, and the matching criteria that would be illustrated in FIG. 3, because of recognition problems or missing information, RCR 204 passes the address image to the image processing subsystem (IPS) 206. In IPS 206, the address image is presented to a data conversion operator who manually enters the information into IPS 206, where the entered address is compared to a nationally maintained address database such as address database 106, which may contain the street number, street name, zipcode and zipcode suffix associated with a residence or firm. If an exact match to the address image is found in address database 106, mail item 112 is transferred to delivery network 106 for delivery to the recipient.

However, If an exact match to the individual elements of the address image is not found in address database 106, an attempt is made to determine a match to the address image using name/firm database 104 and the matching criteria that will be illustrated in FIG. 3. Then, if a match is deemed to exist, mail item 112 is transferred to delivery network 106 for delivery to the recipient. The matching criteria will be discussed below in detail in conjunction with FIG. 3.

At this point, if OCRS 202, RCR 204, and IPS 206 have not been able to identify an exact match to the address image using address database 106 or determine that a match is deemed to exist using name/firm database 104 in conjunction with the matching criteria that will be illustrated in FIG. 3, mail item 112 is not coded for processing by delivery network 116, but transferred to undeliverable queue 118 for mail item 112 to be returned to the original customer (the sender of mail item 112).

In accordance with one embodiment of the invention, FIG. 3 illustrates an exemplary table of the matching criteria that may be used in conjunction with the name/firm database 104. As discussed above, name/firm database 104 may contain information such as an individual or firm name, street name, street number, apt/suite number, zipcode, and zipcode suffix. Based on firm/name database 104 and the matching criteria, mail item 112, which may never get coded correctly and transferred to delivery network 116, because of insufficient or incorrect address information on mail item 112, may now be coded with a high degree of accuracy and transferred to delivery network 116 for delivery to the recipient.

In the exemplary table illustrated in FIG. 3, the information from name/firm database 104 may be accessed based on an individual's last name or the firm name that is in the address image taken from mail item 112. Examples from the exemplary table of FIG. 3 will be described as if the table constituted a matrix. For example, the entry in the upper left corner of the table, which would indicate an exact match in the address image of the firm name will be referred to as entry 1A. As another example, the entry in the lower right corner of the table, which would indicate that a match should be deemed to exist will be referred to as entry 28L.

Furthermore, in the exemplary table of FIG. 3, the heading "presumed firm" indicates that an exact match for the firm name has not been found, but a presumption is being made that the firm name found has a high probability of being the firm identified in the address image and a match is deemed to exist. For example, the firm name in the address image may be "Northern Virginia Medical Center" and the name found in name/firm database 104 is "Northern Virginia Hospital." In this case, a presumption may be made that the two firm names are one and the same.

The following examples are based on the exemplary matching criteria illustrated in FIG. 3, which determines whether a match should be deemed to exist between the address image elements and an address found in name/firm database 104.

EXAMPLE 1

If the address image has an exact firm name element (1A), street name element (1E), zipcode suffix element (1F), and zipcode element (1K) match with an entry in name/firm database 104, but the address image street number element (1G) and apt/suite number element (1H) does not match an entry in name/firm database 104, the exemplary matching criteria (1L) will indicate a match of the address image and the address in name/firm database 104 is deemed to exist.

EXAMPLE 2

If the address image has a presumed firm name element match (12B), but no street information element match (i.e., meaning no street name or number) (121), and no zipcode element (12K) match with an entry in name/firm database 104, the exemplary matching criteria (12L) will not indicate a match is deemed to exist.

EXAMPLE 3

If the address image last name element (C15), street name element (15E), zipcode suffix element (15F), and the zipcode element (15*k*) match an entry in name/firm database 104, but the address image street number element (15G) and apt/suite number element (15H) do not match an entry in name/firm database 104, the exemplary matching criteria (15L) will indicate a match should be deemed to exist.

EXAMPLE 4

If the elements corresponding to the individual's first and last name match (24D), and the street number, apt/suite number, and zipcode match ((24G), (24H), and (24K), respectively), name/firm database 104, but street name element (24E) and zipcode suffix element (24F) do not match an entry in name/firm database 104, the exemplary match criteria (24L) will indicate a match is deemed to exist.

In view of the foregoing examples using the exemplary match criteria illustrated in FIG. 3, it will be appreciated that the embodiments of the present invention may be expanded to provide additional rows in the matrix and therefore provide additional criteria to determine whether a match should be deemed to exist.

Method of Operation

Figure 4:
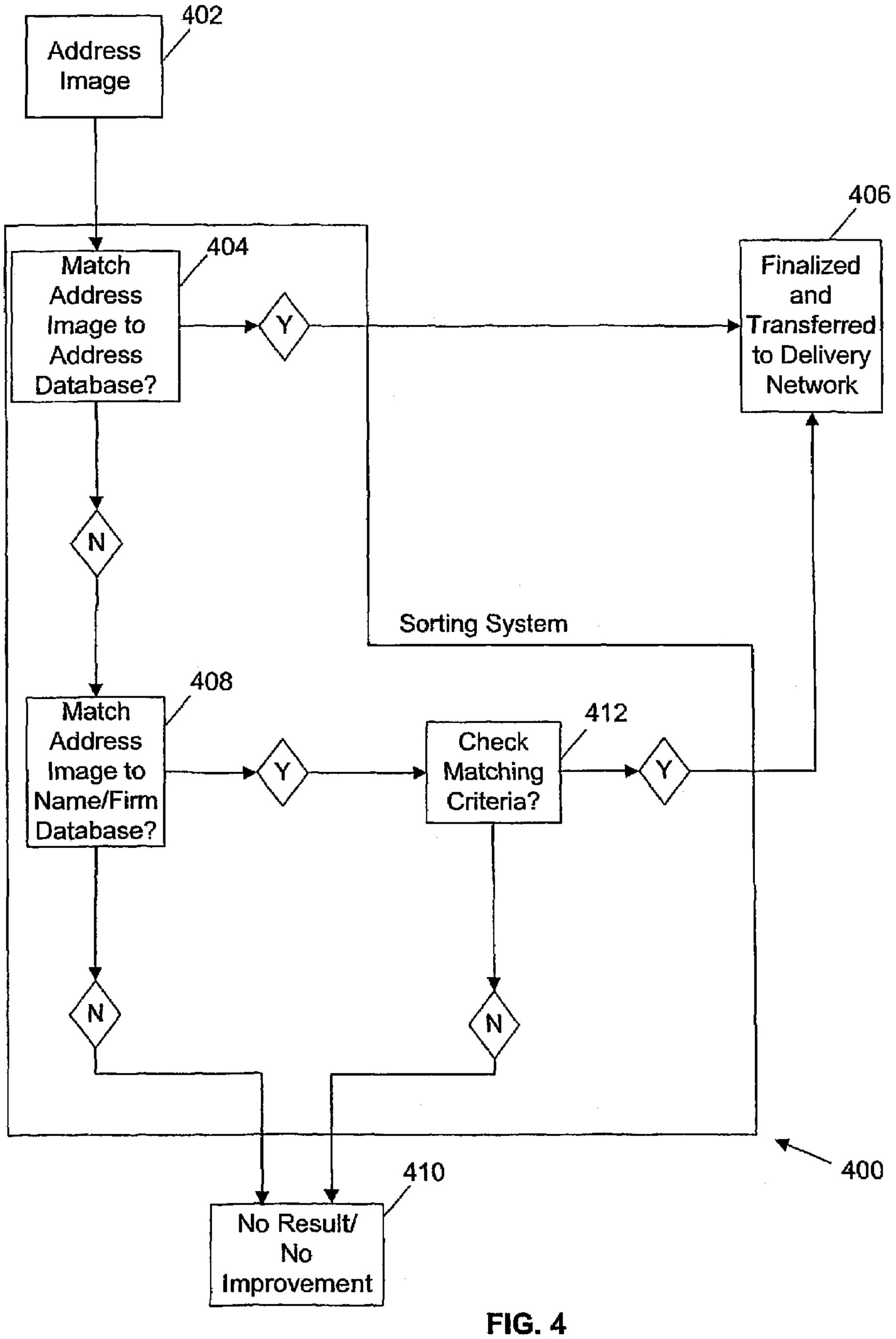
FIG. 4 is a flow chart illustrating an exemplary method used with one embodiment of the sorting system(s) consistent with the present invention.

FIG. 4 is a flow chart illustrating an exemplary method 400 used in accordance with one embodiment of sorting system 110 (FIG. 1) of the present invention. It important to point out that the exemplary method 400 may be carried out in one or all of the subsystems of sorting system 110, which may be comprised of an optical character subsystem, a remote computer reader subsystem, and an image processing subsystem. It is also important to mention that method 400 may be executed serially and/or in parallel in the subsystems of sorting system 110.

FIG. 4 illustrates that method 400 begins when the address image 402 is captured from mail item 112 (FIG. 1). Then, the address image 402 is submitted to the subsystems of sorting system 110. In the subsystems of sorting system 110, an attempt is made to match address image 402 to the address database 106 (FIG. 1). If address image 402 is matched to an address in address database 106, mail item 112 is finalized and transferred to delivery network (406) for delivery to the mail item recipient.

If, however, a match to address image 402 is not found, an attempt is then made to match address image 402 to name/firm database 104 (408). If a match to the firm name, presumed firm name, last name, or first and last name, is not found in name/firm database 104, method 400 provides a no result/no improvement output (410) as an indication that address image (402) could not be resolved.

If at stage 408, a match to the firm name, presumed firm name, last name, or first and last name is found, method 400 proceeds to check the matching criteria, which is illustrated in FIG. 3 and explained above in examples 1-4. Then, if the matching criteria is confirmed, mail item 112 is finalized and transferred to delivery network (406) for delivery to the mail item recipient.

If, however, the matching criteria is not confirmed at stage 412, method 400 provides a no result/no improvement output (410) as an indication that address image (402) could not be resolved.

In view of the foregoing, it will be appreciated that the exemplary embodiments of the present invention provide an improved system and method for capturing and resolving addresses on mail items. Still, it should be understood that the foregoing relates only to the exemplary embodiments of the present invention, and that numerous changes may be made thereto without departing from the spirit and scope of the invention as defined by the following claims.

We claim:

1. A system for sorting mail items, comprising:
a first database containing addresses and ZIP codes for a plurality of mail item recipients;
a second database containing a plurality of individual and firm names and their associated addresses;
an imaging device for capturing an image of address information on the mail item; and
one or more subsystems containing an algorithm that:
compares the address information with the first database and determines if there is a match,
only if the address information and the first database is unmatched, compares the address information to the second database, determines, according to a set of criteria, whether a match exists between the address information and a listing in the second database, and if a match exists between the address information and a listing of either the first or second database, deems the message deliverable, and resolves the address information based on the matched listing.

2. The system of claim 1, including a plurality of subsystems each containing an associated algorithm that executes the comparisons of address information with the first and second databases.

3. The system of claim 2, wherein the associated algorithm within the plurality of subsystems receives the address information and executes comparisons on the first database in parallel to determine if a match exists and, if the address information is unmatched, executes comparisons with listings of the second database in parallel to determine if a match exists.

4. A method for sorting mail items having address information comprised of a plurality of elements including a name element, the method comprising the steps of:

identifying the plurality of elements on a mail item;

comparing each element of the plurality of elements on the mail item to listings of a first database and identifying matched and unmatched elements, wherein if all of the plurality of elements on the mail item match a listing in the first database, the address information is resolved based on the listing in the first database, and the mail item is deemed deliverable; and wherein only if less than all of the plurality of elements on the mail item match a listing in the first database, comparing the plurality of elements on the mail item to a second database and identifying matched and unmatched elements; and applying an algorithm to the matched and unmatched elements of the mail item with respect to listings of the second database, to determine if a set of criteria of the algorithm are met, and if the set of criteria are met, deeming the mail item to be deliverable and resolving the address information based on a listing in the second database.

5. The method according to claim 4, wherein the identifying step comprises capturing the address elements with an optical device.

6. The method according to claim 4, wherein the identifying step comprises manually identifying the address elements.

7. A system for sorting mail items with address information having a plurality of elements, the system comprising:

means for identifying the plurality of elements on a mail item;

means for comparing each identified element of the plurality of elements of the mail item to listings of a first database and identifying matched and unmatched elements; and for, if the plurality of elements of the mail item match a listing in the first database, resolving the address information based on the listing in the first database, and deeming the mail item to be deliverable;

means for comparing the elements of the mail item to listings of a second database only if less than all of the plurality of elements of the mail item match a listing in the first database, and for identifying matched and unmatched elements of the mail item;

means for applying an algorithm to the matched and unmatched elements of the mail item with respect to listings of the second database, to determine if a set of criteria of the algorithm are met, and if the set of criteria are met, deeming the mail item to be deliverable and resolving the address information based on a listing in the second database.

8. The system according to claim 7, wherein the identifying means comprises means for capturing the address information with an optical device.

9. The system according to claim 7, wherein the identifying means comprises means for manual data entry.

10. A system for sorting mail items, comprising:

a first database containing addresses and ZIP codes for a plurality of mail item recipients;

a second database containing a plurality of recipient names, and addresses associated therewith;

an imaging device for capturing an image of address information on the mail item; and one or more subsystems executing a process that:

compares the address information with the first database and determines if there is a match, only if the address information is unmatched, compares the address information to the second database, and determines, according to a set of criteria, whether a match exists between the address information and the recipient names of only the second database, and if a match exists between the address information in either the first or second database, deems the message deliverable, and resolves the intended address information based on the match.

11. The system according to claim 10, wherein the recipient names comprise individual and business names.

* * * * *